US008275384B2

(12) United States Patent
Das et al.

(10) Patent No.: US 8,275,384 B2
(45) Date of Patent: Sep. 25, 2012

(54) SOCIAL RECOMMENDER SYSTEM FOR GENERATING DIALOGUES BASED ON SIMILAR PRIOR DIALOGUES FROM A GROUP OF USERS

(75) Inventors: Rajarshi Das, New Rochelle, NY (US); Robert George Farrell, Cornwall, NY (US); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/728,205

(22) Filed: Mar. 20, 2010

(65) Prior Publication Data
US 2011/0230229 A1   Sep. 22, 2011

(51) Int. Cl.
*H04W 72/00* (2009.01)
(52) U.S. Cl. .................. 455/452.1; 455/450
(58) Field of Classification Search ........... 455/452.1, 455/550.1; 379/88.16; 709/233, 203, 202; 718/104
See application file for complete search history.

(56) References Cited

U.S. PATENT DOCUMENTS

| 7,076,049 B2 | 7/2006 | Bushey et al. |
| 7,284,244 B1 * | 10/2007 | Sankaranarayan et al. ... 718/104 |
| 7,370,004 B1 | 5/2008 | Patel et al. |
| 2006/0093101 A1 * | 5/2006 | Patel et al. ............. 379/88.16 |
| 2006/0262921 A1 | 11/2006 | Eppel et al. |
| 2007/0112719 A1 | 5/2007 | Reich et al. |
| 2008/0243631 A1 | 10/2008 | Kane et al. |
| 2009/0156179 A1 | 6/2009 | Hahn et al. |
| 2010/0002850 A1 | 1/2010 | Jaiswal et al. |

FOREIGN PATENT DOCUMENTS
WO   WO2006118558 A1   11/2006

OTHER PUBLICATIONS

Human-Computer Interaction Fundamentals (Human Factors and Ergonomics) Andrew Sears (Editor), Julie A. Jacko (Editor) p. 224.
B. Arons, "SpeechSkimmer: A System for Interactively Skimming Recorded Speech," ACM Transactions on Computer-Human Interaction, vol. 4, No. 1, pp. 3-38 (Mar. 1997).
M. Yin, "Dial and See-Tackling the Voice Menu Navigation Problem with Cross-Device User Experience Integration," In Proceedings of the 18th Annual ACM Symposium on User interface Software and Technology (Seattle, WA, USA, Oct. 23-27, 2005).

(Continued)

*Primary Examiner* — Kiet Doan
(74) *Attorney, Agent, or Firm* — Preston Young; Michael J. Chang, LLC

(57) ABSTRACT

Techniques for organizing information in a user-interactive system based on user interest are provided. In one aspect, a method for operating a system having a plurality of resources through which a user can navigate is provided. The method includes the following steps. When the user accesses the system, the resources are presented to the user in a particular order. Interests of the user in the resources presented are determined. The interests of the user are compared to interests of other users to find one or more subsets of users to which the user belongs by virtue of having similar interests. Upon one or more subsequent accesses to the system by the user, the order in which the resources are presented to the user is based on interests common to the one or more subsets of users to which the user belongs.

19 Claims, 10 Drawing Sheets

OTHER PUBLICATIONS

W. Hill et al., "Recommending and evaluating choices in a virtual community of use," Proceedings of the SIGCHI conference on Human factors in computing systems, pp. 194-201 (1995).

Y. Koren et al., "Matrix factorization techniques for recommender systems," IEEE Computer 30-37 (2009).

J.A. Konstan et al., "GroupLens: Applying Collaborative Filtering to Usenet News," Commun. ACM, vol. 40, No. 3 pp. 77-87 (Mar. 1997).

M. Claypool et al., "Inferring User Interest," IEEE Internet Computing, pp. 32-39 (2001).

J.L., Herlocker, "Evaluating Collaborative Filtering Recommender Systems," ACM Transactions on Information Systems, vol. 22, No. 1, pp. 5-53 (2004).

J. Freyne et al., "Increasing Engagement Through Early Recommender Intervention," ACM (Oct. 2009).

M.F. McTear, "Spoken Dialogue Technology: Enabling the Conversational User Interface," ACM Computing Surveys, vol. 34, No. 1, pp. 90-169 (Mar. 2002).

J. Mod et al., "Find Me if You Can: Designing Interfaces for People Search," ACM (Jan. 2008).

R. Sheizaf et al., "Social Recommender Systems: Recommendations in Support of E-Learning," International Journal of Distance Education Technologies, vol. 3, No. 2, pp. 30-47 (Apr.-Jun. 2005).

D. Lambert et al., "Implementation Experience with NRECA's MultiSpeakREGISTER Integration Specification," IEEE (2007).

N. Patel et al., "Experiences Designing a Voice Interface for Rural India," IEEE SLT—Spoken Language Technologies (2008).

N. Patel et al., "A Comparative Study of Speech and Dialed Input Voice Interfaces in Rural India," CHI conference on Human factors in computing systems (2009).

S. Agarwal et al., "Content Creation and Dissemination by-and-for Users in Rural Areas," ICTD International Conference on Information and Communication Technologies and Development (2009).

A. Kumar et al., "Voiserv: Creation and Delivery of Converged Services Through Voice for Emerging Economies," WoWMoM'07 Proceedings of the 2007 International Symposium on a World of Wireless, Mobile and Multimedia Networks (2007).

S. Kristoffersen et al., "Making Place" to Make IT Work: Empirical Explorations of HCI for Mobile CSCW, Proceedings of the international ACM SIGGROUP conference on supporting group work GROUP, p. 276-285 (1999).

* cited by examiner

DEVICE TABLE:

| PHONENUMBER |
|---|
|  |
|  |
|  |
|  |
|  |

RECOMMENDATION TABLE:

| PHONENUMBER | URIS | SCORE |
|---|---|---|
|  |  |  |
|  |  |  |
|  |  |  |
|  |  |  |
|  |  |  |

FIG. 9
900
MENU TABLE:

| QUESURI | ANSURI | PATHDURATION | NUMACCPATH |
|---|---|---|---|
|  |  |  |  |
|  |  |  |  |
|  |  |  |  |
|  |  |  |  |
|  |  |  |  |

FIG. 10
1000
INTEREST TABLE:

| PHONENUMBER | URI | NUMACC | DURATION |
|---|---|---|---|
|  |  |  |  |
|  |  |  |  |
|  |  |  |  |
|  |  |  |  |
|  |  |  |  |

FIG. 11
1100
RESOURCE TABLE:

| URI | TOTALDURATION | INCRDURATION | RESOURCETYPE |
|---|---|---|---|
|  |  |  |  |
|  |  |  |  |
|  |  |  |  |
|  |  |  |  |
|  |  |  |  |

1400B

1400A

1500C

1500D

SOCIAL RECOMMENDER SYSTEM FOR GENERATING DIALOGUES BASED ON SIMILAR PRIOR DIALOGUES FROM A GROUP OF USERS

FIELD OF THE INVENTION

The present invention relates to user-interactive systems, and more particularly, to techniques for organizing information in a user-interactive system based on user interest.

BACKGROUND OF THE INVENTION

The rapid uptake of mobile telephones and cheaper and more widespread mobile connectivity are driving adoption of information and communication technology in developing nations, but access to the Internet remains difficult for two major reasons. First, the Internet is mostly in English and is thus largely inaccessible to billions of people for whom English is not a native or second language. Second, the Internet is accessible largely through text-based technologies (i.e., web browsing, email and text messaging) and is thus not usable by those who are unable to read and write. Systems have been created to address this problem. Using the Spoken Web system, for example, individual users or organizations can create interactive voice-based applications (voice sites) employing inexpensive mobile telephones or touchtone wired telephones. These voice sites can then be accessed and modified by other Spoken Web users with their telephones. See, for example, N. Patel et al., "Experiences Designing a Voice Interface for Rural India," *IEEE SLT—Spoken Language Technologies* (2008), N. Patel et al., "A Comparative Study of Speech and Dialed Input Voice Interfaces in Rural India," *CHI conference on Human factors in computing systems* (2009), S. Agarwal et al., "Content Creation and Dissemination by- and-for Users in Rural Areas," *ICTD International Conference on Information and Communication Technologies and Development* (2009) and A. Kumar et al., "Voiserv: Creation and Delivery of Converged Services Through Voice for Emerging Economies," *WoWMoM '07 Proceedings of the 2007 International Symposium on a World of Wireless, Mobile and Multimedia Networks* (2007) (hereinafter "Kumar"), which describe systems that are interactive voice response (IVR) applications.

IVR is a technology that allows a computer to detect voice and dual-tone multi-frequency signaling (DTMF) keypad inputs (touchtone) and respond with audio. IVR systems are common for automating call center automated response, but there are many other applications, including telephone banking, airline reservation booking and other information services (e.g., weather). Users typically navigate by listening to the system audio output until there is some type of prompt for user input and then respond with spoken commands that are recognized using a speech recognition engine or using touch-tone keypad inputs. This user input is used to generate more system audio output. Given the low technological barrier to deploying interactive voice applications, there is considerable promise for widespread adoption, especially in low-literacy populations, provided that the applications can be readily accessed through audio navigation.

However, effective navigation through large amounts of audio content is a well-known challenge (see, for example, S. Kristoffersen et al., "Making Place" to Make IT Work: Empirical Explorations of HCI for Mobile CSCW," Proceedings of the international ACM SIGGROUP conference on supporting group work GROUP, p. 276-285 (1999)). This issue is further compounded by the limited user input capabilities of touchtone and mobile telephones. Techniques including auditory icons and earcons (see, for example, Human-Computer Interaction Fundamentals (Human Factors and Ergonomics) Andrew Sears (Editor), Julie A. Jacko (Editor) pg. 224) and skimming (see, for example, B. Arons, "SpeechSkimmer: A System for Interactively Skimming Recorded Speech," *ACM Transactions on Computer-Human Interaction*, vol. 4, no. 1, pgs. 3-38 (March 1997)) can improve sequential access to and local navigation among voice recordings. Information retrieval using words and phrases extracted using automatic speech recognition has had some success, but some regions of the world have many languages and dialects, resulting in high recognition errors. Also, users do not always know what they are searching for. Thus, the problem of selecting, filtering and structuring relevant audio content from a large database remains (see, for example, M. Yin, "Dial and See-Tackling the Voice Menu Navigation Problem with Cross-Device User Experience Integration," In Proceedings of the 18th Annual ACM Symposium on User interface Software and Technology (Seattle, Wash., USA, Oct. 23-27, 2005)). In some cases, metadata can be inferred from the audio content, such as the gender of the speaker, but this information may be of only limited use in structuring relevant audio content. With little metadata available, user-directed browsing through this space is difficult and error-prone.

Therefore, techniques that improve user navigation through audio content on voice-based interactive systems would be desirable. The most common way of improving user navigation is by reorganizing the interactive dialogue of user input and audio response. There are existing methods for automatically or semi-automatically restructuring IVR menus. See, for example, U.S. Pat. No. 7,076,049 issued to Bushey et al., entitled "Method of Designing a Telecommunications Call Center Interface."

IVR systems may have large amounts of audio for several reasons. An IVR system may access a database of audio recordings that grows over time, for example, or an IVR system may store and retrieve user recordings that are then navigated by other users. In the Spoken Web (see Kumar), for example, the user can press a key to speak an answer to a question and have it recorded and stored in an audio file that is then later played back for other users. Users must navigate large numbers of these recordings. IVR menus through this audio cannot be optimized for different groups or individual users ahead of time because the set of recordings and the set of users change over time.

A social recommender is a software system that uses ratings of items from prior users to recommend items to new users. Recommendations help users find items that are interesting to them. Items can be movies, music, books, articles, web pages, products, and so on. A rating is a user's estimate of their interest in an item along a scale, for example, from one to five. Social recommenders typically suggest items of interest (recommending) or filter out items not of interest (collaborative filtering). Social recommenders go through users' ratings of items to find patterns. A pattern could be, for example, a subset of all users who tend to agree on their ratings of items (a cohort). For example, most users from New Orleans, USA might be interested in articles about flooding while most users from Alaska, USA might be interested in articles about oil spills. If a user fits the pattern, then recommendations can be made (or filtering performed) based on the item ratings of other users in the cohort of similar users. Social recommenders are common today on the Web.

Therefore, techniques for using social recommendation for IVR would be desirable.

SUMMARY OF THE INVENTION

The present invention provides techniques for organizing information in a user-interactive system based on user interest. In one aspect of the invention, a method for operating a system having a plurality of resources through which a user can navigate is provided. The method includes the following steps. when the user accesses the system, the resources are presented to the user in a particular order. Interests of the user in the resources presented are determined. The interests of the user are compared to interests of other users to find one or more subsets of users to which the user belongs by virtue of having similar interests. Upon one or more subsequent accesses to the system by the user, the order in which the resources are presented to the user is based on interests common to the one or more subsets of users to which the user belongs.

A more complete understanding of the present invention, as well as further features and advantages of the present invention, will be obtained by reference to the following detailed description and drawings.

BRIEF DESCRIPTION OF THE DRAWINGS

FIG. 7 is a diagram illustrating an exemplary device table according to an embodiment of the present invention;

FIG. 8 is a diagram illustrating an exemplary recommendation table according to an embodiment of the present invention;

FIG. 9 is a diagram illustrating an exemplary menu table according to an embodiment of the present invention;

FIG. 10 is a diagram illustrating an exemplary interest table according to an embodiment of the present invention;

FIG. 11 is a diagram illustrating an exemplary resource table according to an embodiment of the present invention;

DETAILED DESCRIPTION OF PREFERRED EMBODIMENTS

Provided herein are techniques for organizing information in user-interactive systems focused on improving/enhancing user access to the information. Namely, given a set of resources with options for navigating amongst them and data about prior use of these resources, if groups of users can be identified who took the same paths (for example, in terms of listening sufficiently to the resources along the path, see below) then the resources can be reorganized so that users in these groups are presented paths to resources popular amongst the group first or are signaled to take navigation options leading to these popular resources.

Figure 1:
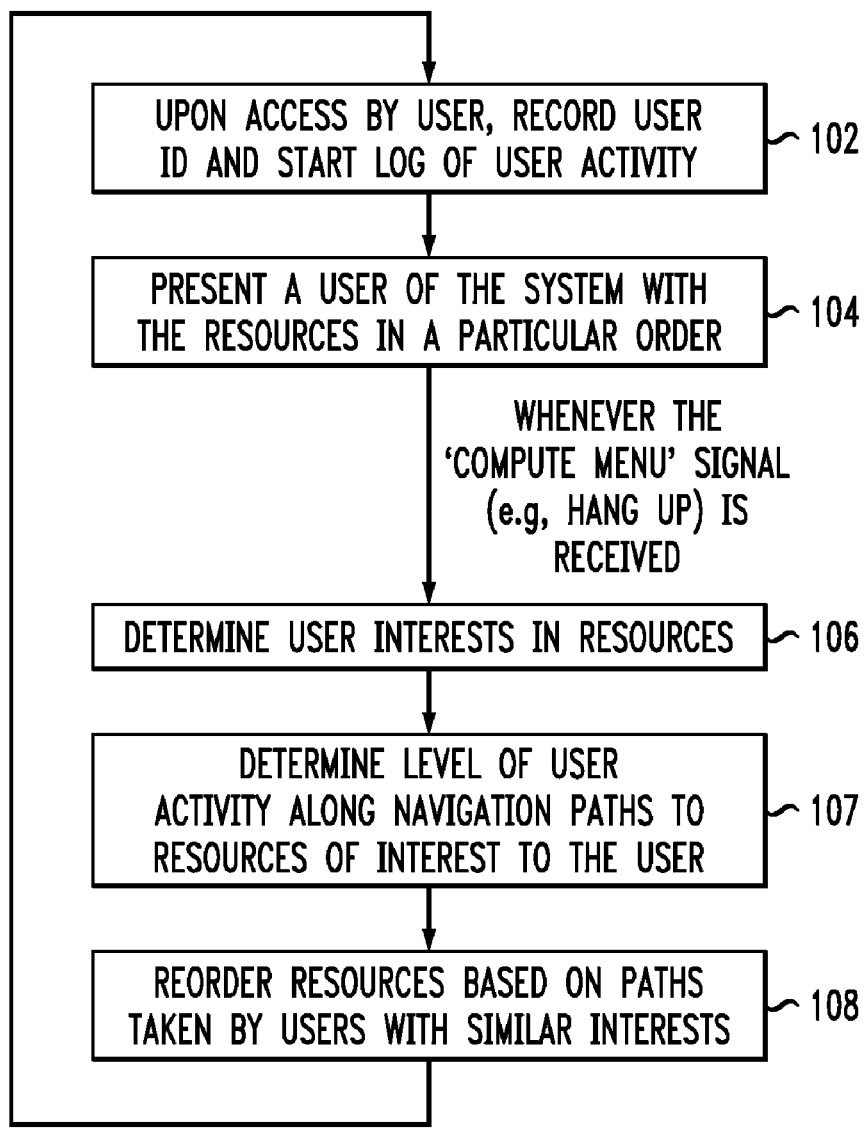
FIG. 1 is a diagram illustrating an exemplary methodology for operating a system having a plurality of resources through which a user can navigate according to an embodiment of the present invention.

FIG. 1, for example, is a diagram illustrating exemplary methodology 100 for operating a system having a plurality of resources through which a user can navigate. The present techniques will be described herein in the context of an exemplary voice-based system, e.g., an interactive voice response (IVR) system that users can access via telephone, such as system 1200 of FIG. 12 (described below). However, the instant teachings are more generally applicable to any user-interactive system that contains a plurality of resources. Examples of such systems include web sites, interactive video systems, and music services. Further, the IVR system, e.g., system 1200 of FIG. 12, can include an apparatus, such as apparatus 1300 of FIG. 13 (described below), configured to perform the steps of methodology 100 as well as any of the other methodologies described herein.

The resources can include, but are not limited to, recordings of speech, music, and video soundtracks. In user-interactive systems with a video display, resources can be videos, documents, animations, web pages or other digital data. It is assumed herein that the resources are more or less interesting to any given user depending on the information contained therein, and that users tend to spend more time on resources of interest. For example, a user might spend more time listening to a song he/she likes or reading a news article in which he/she is interested. Furthermore, a user may spend time repeatedly on interesting resources. For example, a user may listen to a speech several times to understand it more deeply. In the case of an IVR system, the resources, which are audio files, can include pre-recorded audio and voice recordings. The voice recordings can include questions posted, for example, by users, and answers to the questions posted, for example, by a person with expertise answering the kinds of questions being asked or by users, as will be described below. In these cases, the item of interest is really the dialogue (question followed by an answer) not an item (question or answer) alone. More generally, it is the path through the resources (see below).

In step 102, upon accessing the system (i.e., in the case of an IVR system this occurs when the user calls into the system) the identification of the user (User ID) is recorded. Using the IVR system as an example, conventional telephone caller ID data would suffice in this regard. However, in cases where multiple users share a telephone, it is preferable that another method be used to identify each user. For example, a user may have to press a unique sequence of keys on his/her touchtone keypad when accessing the system, so as to uniquely identify that user. The caller ID (phone number) or other unique identifier for the device used by the user (i.e., the User ID) can be stored by the system in a device table. An exemplary device table is shown, for example, in FIG. 7, described below. As will be described in detail below, the User ID is used to start (record) a log of activity for that user that in addition to the User ID can include the resources the user accesses and an amount of time the user spends on each resource and/or a number of times the user accesses each resource.

In step 104, the user is presented with the resources in a particular order. By way of example only, in the case of a voice-based system, the user may be presented with voice menus through which the user can navigate and/or from which the user can select resources (i.e., in the case of an IVR system this can be done by the user making choices by way of the keys on a touchtone telephone, through voice recognition or by other suitable means). In this step, a user calling into the system may be presented with a default order of items 1 through x, which are presented to the user/caller. As will be described in detail below, the system is interactive and user-navigable. In some embodiments, the user does not have to listen to all of the items (i.e., the user can skip items). In some embodiments, the user does not have to listen to each item in its entirety (i.e., users can make a selection before the item has finished playing). Further, as will be described in detail below, the particular order in which the items are presented to the user may change (may be reordered) based on the preference (interests) of the user and/or of other users in the system.

According to an exemplary embodiment, the resources are voice recordings through which the user can navigate and/or select by providing user input (e.g., key presses). The user input may be in response to a voice menu (as above) or could be known to the user through other means (for example, a physical card with options listed). In response, the user may listen to a voice recording or create a voice recording. The user may also provide no input and simply listen to the voice recordings in order. Note also that the user can press a key to skip a voice recording and move on to the next voice recording. Thus, the user engages in an interactive dialogue with the system by pressing keys, recording his/her voice and/or listening to recordings of his/her voice and the voices of other users.

Due to prior interaction with the system, there may be an ordered list of recommended voice recordings (recommendations) stored for this user. In this case, the system uses the recommendations to organize the voice menus into a dialogue and create an order for the voice recordings. The system thus generates a dialogue comprised of the voice menus and voice recordings completely automatically that makes the recommended voice recordings more easily accessible to the user. In practice, according to the present techniques in the context of an IVR system, this means putting the recommended voice recordings first. See, for example, FIG. 2 described below. The ordered list of recommendations can be stored by the system in a recommendation table. An exemplary recommendation table is shown, for example, in FIG. 8, described below. The recommendation table records the User ID (phonenumber), an ordered list of uris (uniform resource identifiers for recommended voice recordings) and a score.

In one specific implementation, in step 106, when the user finishes navigating or signals completion (e.g., hangs up), the system determines user interest from the level of activity (amount of time listening) along sequences of resources, or paths. The level of activity on earlier resources in a path indicates interest in the final destination of the path. For example, watching a trailer (a short advertisement) for a movie may indicate interest in the movie. In the present terminology, the trailer and the movie, in that particular sequence is a path. The last resource on the path is the "destination" of the path. The other resources on the path are indicators of interest in the destination. The system determines user interest in the destination by adding the total duration (amount of time) the user has listened to each of the resources on the path (including the destination resource). Note that the total duration the user has listened to the recording is different than the length of the recording, i.e., if the user chooses to skip in the middle of the resource, then the duration is shorter than the length of the recording. However, users may have the option of navigating back to the beginning or calling in to the system multiple times such that the total duration a user has listened to a recording becomes higher and higher.

In an alternative embodiment, interest is determined by a number of accesses. Specifically, the number of accesses of each resource on the path, including the destination, is summed to determine the user interest in the destination. Other statistics may be used to track the interest of the user in the resources. These statistics can be computed from the date/time of access, the current date/time, the number of accesses, the duration of access or other measurements.

By way of example only, the voice recordings can include a number of questions and a number of answers to the questions through which the user can navigate and/or select. A voice menu may present different options for navigating these questions and answers. For example, an initial menu may provide an option to ask a question, listen to one's own questions answered, or start listening to questions and answers. If the user provides no input then the last option may be automatically taken and the system starts playing questions and answers. A 'question menu' may play a question audio file and then provide an option to skip to the next question, record an answer to the question, or go to the answer to this question if one has been provided. If the user provides no input then the last option may be automatically taken and the answer starts playing. An 'answer menu' may play an answer audio file and then present an option to replace the answer or skip to the next question. If the user provides no input then the last option may be taken and the system starts playing the next question. Note that audio resources (audio files) are organized in a particular hierarchical structure according to the menu options because the user can skip from question to question and at each question has the option of listening to an answer (or recording an answer). However, there is a particular default order through this hierarchical structure. The default order is the sequence of resources that will be played if the user provides no input. For example, the default order may proceed from a question to an answer to the next question and its answer, and so on. Note that listening to a question can indicate interest in the answer, even if the user does not spend any time on the answer. Whenever a recording is created (a question or an answer), the total duration (or length of the recording) is stored in a resource table, such as Resource Table 1100 (FIG. 11) described below. A number of different data structures may be implemented to organize the data in the system. In one specific implementation, the voice menus, options, and so on are encoded in a VoiceXML file. The VoiceXML file is a document in an XML format. A Voice Browser interprets the VoiceXML to create a Document Object Model (DOM) tree data structure that can be traversed to generate the voice menus. The concept of VoiceXML, DOM and the tree data structures to implement it are well-known to those of skill in the art and thus are not described further herein. Other suitable approaches to specifying a voice menu structure include, but are not limited to, text files in other formats, a software program written in a suitable programming language such as Java, C, Python and a graphical user interface.

In non-voice based applications, such as where the system is accessed, e.g., through a computer via the Web, visual data such as video, documents and animation can be presented to the user in the same fashion. By way of example only, when the user accesses the system he/she may be presented with Web pages with a number of hyperlinks leading eventually to videos. Particular hyperlinks may be highlighted, starred or otherwise decorated to indicate which are the recommended hyperlinks. Each hyperlink may link to another Web page that, for example, describes the video, then there is finally a link to the video. The system records both the amount of time the user spends on the Web page describing the video and the amount of time the user spends watching the video itself. The amount of time spent on a Web page may be determined, for example, by embedding a software program (e.g., applet) that keeps track of when the page has loaded and has been navigated away from. Other techniques may be used to track the user as he/she skips around a video or pauses an animation. In any case, the total duration spent on paths through the resources can be determined.

It is a goal of the present teachings to make navigating through various resources, which can be quite voluminous, easier and more efficient. This is especially applicable in the context of audio data, where navigating through a long list of resources can be extremely time-consuming. For example, people are often dissatisfied with using IVRs because it takes a considerable time to navigate and navigation through voice menus can be confusing. The techniques provided herein allow for the most relevant information for an individual to be readily available. Further, as will be described in detail below, the system is updated dynamically, in accordance with the behavior of the users, to accommodate changes in how the community of users makes use of current items of interest.

The resources the user accesses as he/she navigates through the system are assumed to be resources in which the user is interested. Importantly, the 'interests' of the user can, by way of the techniques presented herein, be determined automatically (the user's activity is indicative of the user's interest without any other input from the user). This may be accomplished in a number of different ways. See, for example, FIGS. 3 and 4, described below.

In step 107, a level of user activity along navigation paths to resources of interest to the user is determined. An exemplary process for performing step 107 is described in detail in conjunction with the description of FIG. 5, below. In general however, a set of paths is computed and a total time for each path in the set is calculated based on the time spent on each of the resources in the given path.

In step 108, the resources in the system are reordered, for the user, based on other users who access the system and who have similar interests. This step is performed to make access to resources easier and more efficient by reordering the resources based on their popularity with a group of similar users (cohort). Recommended resources, those resources more popular with the cohort, are put first. Resources that the user has already accessed longer than some threshold amount of time are removed from the ordered list of recommended resources so that the user hears resources new to the user first. This is however optional and the recommendations could in fact include resources to which the user has spent a lot of time listening in the past. The ordered list of recommended resources is stored so that it can be retrieved given the User ID. See, for example, Recommendation Table 800, in FIG. 8, described below.

Using a simple example to illustrate this principle, assume that there are three voice recordings, all three being interesting resources for users. The first time a first user calls into the system, the user skips the first voice recording presented but chooses to listen to the second and then hangs up. Since there are no other users, the system does nothing. A second user then calls into the system for the first time and does the same thing, mainly, skips the first recording and listens to the second, but then goes on to listen to the third recording. When this user hangs up, the system determines that the first user and second user are similar (because they both skipped the first voice recording and listened to the second one). But since the second user also listened to the third recording, the system computes a new voice recording order for the next time the first user calls in, i.e., it stores a new ordering specifically for the first user that puts the third recording first since the second user, a user similar in other respects, found it interesting. Further, the next time the first user calls into the system, the system has only to look up the new order of voice recordings for that user. Following the third recording, the first user will be presented with the first recording and then the second recording. This is because the voice recording that the user has heard before (in this case the second recording) is put last. However, this is not required. The voice recordings the user has heard could be removed or otherwise deemphasized. Note also that the next time the second user calls in, the order will be the same as the first time that user called in since the first recording is the only one the user had not previously heard. If there were several recordings and several users, the system would choose to put first the recordings that were most popular amongst just the subset (cohort) of the users that are similar to the first caller, but not heard before. With the present techniques, storing personalized resource orderings for each user may seem expensive in storage, but it is notable that the resources themselves do not have to be stored, only an identifier or pointer. One skilled in the art would be familiar with methods for implementing pointers to resources. To illustrate the use of paths with a simple example, consider a simple menu tree. A user is presented with question 1, answer 1, question 2 and then answer 2. However, the user can skip from question 1 to question 2. When a first user calls in, assume that user skips question 1 and listens to question 2 and then listens to answer 2 and then hangs up. When a second user calls in, that user also skips question 1 and listens to question 2, but then hangs up. At this point, the system computes that both users listened to question 2. The system creates a new set of menus for the second user that puts question 2 first followed by answer 2 and then question 1 and answer 1. The question and answer pairs are kept together. The system does this by computing a new order for the answers, then consulting a table that provides a correspondence between the question and answer (also referred to herein as "a menu table") to create the voice menus (see above). An exemplary menu table is shown, for example, in FIG. 9, described below.

Note that the recommended resources may be organized and presented in a variety of ways. For example, in some cases, users may need the IVR menu structure to change as little as possible, so that, for example, the order can be remembered. In this case, the recommended resources can be highlighted in some fashion (e.g., with a special tone). Alternatively, a special IVR menu may be added offering the recommended resources separately from the rest of the resources. Step 108 may be accomplished in a number of different ways.

According to an exemplary embodiment, step 106 is performed once a 'compute menu' signal is received by the system. By way of example only, this signal can occur when the user terminates the call (i.e., hangs up). After step 108, when the next user accesses the system, methodology 100 begins again at step 102. A specific example of an implementation of methodology 100 is presented below.

The present techniques provide a social navigation tool, i.e., to generate improved navigation paths through and across interactive voice response applications based on the prior usage of an entire social network, community or other similar grouping of users. The general term of art for this type of tool is a recommender system. The technique most often used by recommender systems, and the one used here, is called collaborative filtering. Collaborative filtering is used to predict a user's interest in items based upon their ratings of other items and the ratings of other users. See, for example, W. Hill et al., "Recommending and evaluating choices in a virtual community of use," *Proceedings of the SIGCHI conference on Human factors in computing systems*," pgs. 194-201 (1995). Collaborative filtering-based recommender systems have been successfully deployed in the marketplace on a large scale by Amazon, Netflix, and other companies. See, for example, Y. Koren et al., "Matrix factorization techniques for recommender systems," *IEEE Computer* 30-37 (2009).

Phone-based audio navigation to relevant content in voice-based systems, especially large connected voice-based systems (see, for example, Kumar) is a major challenge. Given the potentially large number of users of such systems in the developing world and the likelihood of shared information needs and significant user similarities, considerable improvements in audio navigation from the use of collaborative filtering (e.g., by employing the present techniques) are expected. A useful distinction among collaborative filtering-based approaches arises from the types of data used to associate users to products, media resources and other items. In some scenarios, users may provide explicit feedback about their interest in products through ratings. Explicit feedback cannot always be obtained, so some approaches use implicit feedback based on browsing history or search history. In one study, implicit ratings, in the form of time spent reading news articles, were correlated with explicit ratings. See J. A. Konstan et al., "GroupLens: Applying Collaborative Filtering to Usenet News," Commun. ACM, vol. 40, no. 3 pgs. 77-87 (March 1997). Explicit and implicit ratings have been combined and the present techniques could easily be used with explicit ratings as well.

Figure 2:
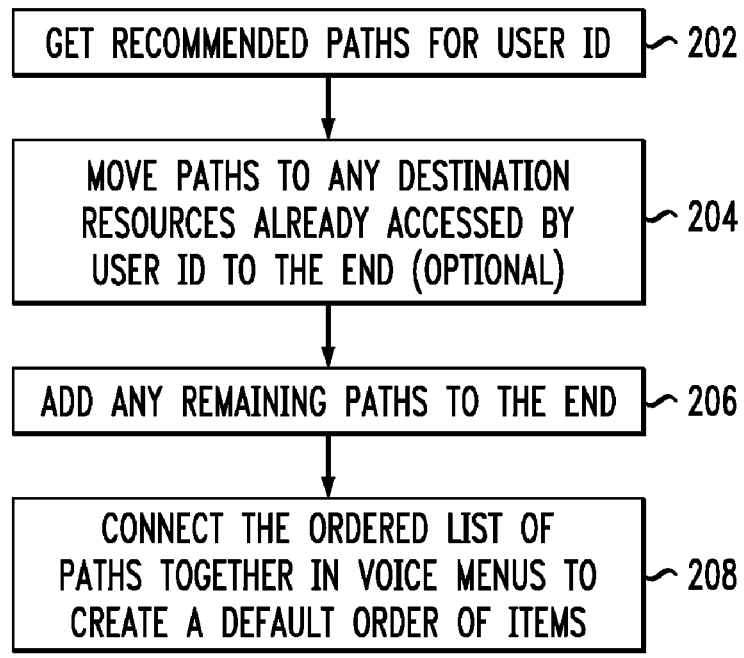
FIG. 2 is a diagram illustrating an exemplary methodology for presenting a user of the system with the resources in a particular order according to an embodiment of the present invention.

FIG. 2 is a diagram illustrating exemplary methodology 200 for presenting a user of the system with the resources in a particular order. Methodology 200 represents one suitable way for performing step 104 of methodology 100 (FIG. 1). In step 202, the system gets a list of recommended voice recordings using the User ID (i.e., from a recommendation table, such as Recommendation Table 800 (FIG. 8) described below). The User ID was recorded in step 102 of FIG. 1 (i.e., in a device table, such as Device Table 700 (FIG. 7) described below). The system then looks up each recommended voice recording (e.g., in a menu table, such as Menu Table 900 (FIG. 9) described below) to get the path to the recommended voice recording. For example, if an answer was recommended, then the system would look up the answer (in ansuri) and find the corresponding question (in quesuri) to create the path (the question and answer pair). A list of paths is created, ordered by the score (in the Recommendation Table). In step 204, the system looks up each of the recommended voice recordings for this User ID to determine if they have already been sufficiently listened to ("experienced") by the user (i.e., from an interest table, such as Interest Table 1000 (FIG. 10) described below), for example, consulting the duration of time the user has listened to the recording, and if so, moves the paths to these voice recordings to the end of the particular order of presentation. An exemplary user interest table is shown, for example, in FIG. 10, described below. The method of determining if a user has sufficiently listened to a voice recording is similar to the method detailed in step 304 of methodology 300 (FIG. 3) described below (and an alternate embodiment in step 404 of methodology 400 (FIG. 4) described below). Basically, the system first looks up how long the user has spent listening to the recording in the past. It then determines if this passes an interest threshold (and if so, the recording is moved to the end of the particular order of presentation). It should be noted that in some situations, as explained above, users may want to revisit resources and in this case the system should skip step 204 (i.e., it is optional). In step 206, the system adds any remaining paths to the ordered list of paths. This step is required so that users can freely navigate to all of the resources. In step 208, the system then connects the ordered list of paths together in voice menus to create a default order of items (the voice recordings) that enable the user to navigate between the items, with the paths to recommended items being presented first, and then by the paths to items already sufficiently accessed, and followed by the remaining paths to items previously accessed but not recommended. It should be noted that the paths to items already sufficiently accessed and paths to items not recommended could be presented in different orders. The non-recommended items as a whole could also be reordered. For example, they could be presented by popularity amongst all users or by recency or other methods, but the recommended items are presented first, in a separate voice menu, or highlighted in some way so that they are more easily accessible to the user.

Figure 3:
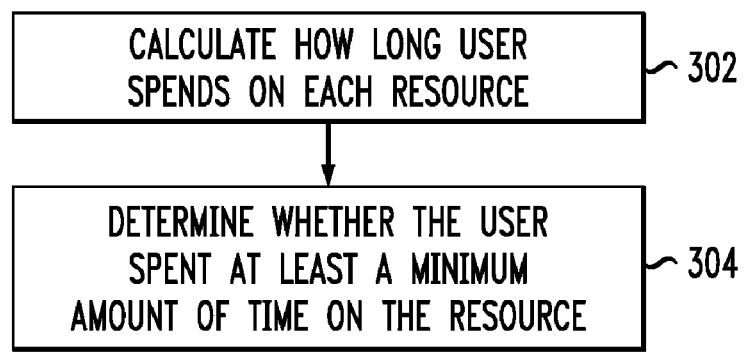
FIG. 3 is a diagram illustrating an exemplary methodology for determining user interests from the user's activity navigating through the resources according to an embodiment of the present invention.

FIG. 3 is a diagram illustrating exemplary methodology 300 for determining user interest from the user's activity navigating through the resources. Methodology 300 represents one suitable way for performing step 106 of FIG. 1. In step 302, an amount of time that the user spends on each resource is calculated. For example, when the resources are voice recordings, the amount of time the user spends listening to each voice recording is calculated. However, in order to determine whether the user is truly interested in a resource (and hence the resource should be included in the user's list of interesting resources), or whether the user is merely spending a cursory amount of time on a resource before skipping to another resource, a threshold time limit is imposed. Specifically, in step 304 the amount of time a user spent listening to a given resource (for example a voice recording) will only be included in the calculation if the user spends a minimum percentage of the total play time (of the recording) listening to the recording. The minimum percentage of listening time can be predetermined, for example, by a person familiar with the nature of the voice recordings, the users, and the input device (the telephone). For example, expert users may start speaking immediately with useful information while non-expert users may take a second or two to start speaking. It is notable that users often make very quick judgments of relevance and therefore a value of a few seconds may, for example be used. Eliminating the number of voice recordings included in the user's list of interesting resources has the added benefit of improving the running time of the methodology.

Figure 4:
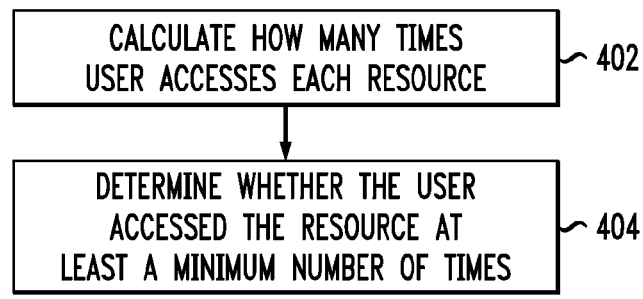
FIG. 4 is a diagram illustrating another exemplary methodology for determining user interests from the user's activity in navigating through the resources according to an embodiment of the present invention.

To give an example, say for instance a user is presented with a plurality of voice recordings and the minimum percentage of listening time is set, for example, at 10 percent (%). If the first recording has a total play time of 10 minutes and after 10 seconds the user prompts the system to skip to the second recording, then the first recording would not be considered to be of interest to the user. By comparison, if the second recording has a total play time of five minutes and the user permits the second recording to play for four minutes (before navigating to another menu or recording), then the second recording would be considered of interest to the user. In this manner, the system can determine the interests of a user without any specific feedback from the user, other than the user's navigating activities. If the recording is of interest to the user, then the system uses the amount of time the user spends on a recording as an implicit rating of the recording, providing an estimate of the user's degree of interest in the recording. In another exemplary embodiment, the level of activity of the user is determined based on the number of accesses. See, for example, FIG. 4. FIG. 4 is a diagram illustrating an exemplary methodology 400 for determining user interests from the user's activity navigating through the resources. In step 402, the number of times the user accesses the resource is calculated. For example, when the resource is a voice recording, an access is counted when the user starts playing the voice recording. If the resource is a Web page, an access is counted as a "hit" when the user request for the Web page is processed by the server. However, in order to determine whether the user is truly interested in a resource (and hence the resource should be included in the user's list of interesting resources), a threshold on the minimum number of accesses is imposed. Specifically, in step 404 the number of accesses to a given resource (for example a voice recording) will only be included in the calculation if the user accesses the given resource a minimum number of times. The minimum number of times can be predetermined, for example, by a person familiar with the nature of the resource, the users, and the input device (the telephone). A value of 2 may, for example, be used. In this case, if the user, for example, happened to revisit a given Web page (or navigate to a voice recording and start playing it) more than once, the Web page (or voice recording) would be added to the user's list of interesting resources. Note that using the number of accesses is more suitable for reference material. In this case, in step 108 of methodology 100 (FIG. 1), the system would not remove the resources already accessed from the list of recommended resources. It makes sense that if one is making recommendations of restaurants, for example, that the user may be willing to go to a restaurant more than once. In this case, the number of accesses to, say, a restaurant review Web page resource could be used as a measure of the user's interest in the restaurant, but also it is reasonable then to recommend restaurants that the user is already aware of (i.e., they have already visited the Web page for that restaurant).

Figure 5:
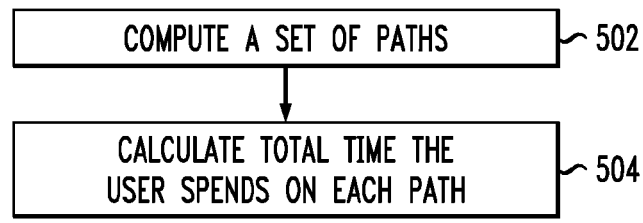
FIG. 5 is a diagram illustrating an exemplary methodology for determining level of user activity along navigation paths to resources of interest to the user according to an embodiment of the present invention.

FIG. 5 is a diagram illustrating exemplary methodology 500 for determining level of user activity along navigation paths to resources of interest to the user. Methodology 500 represents one suitable way for performing step 107 of methodology 100 (FIG. 1). As described, for example, in conjunction with the description of FIG. 3, above, an amount of time that the user spends on each resource is calculated and a given resource will only be included in the user's list of interesting resources if the user spends a minimum amount of time on the resource. Methodology 500 is based on that principle. In step 502, a set of paths is computed, each path being a sequence of resources that leads to a particular destination resource. For example, the last resource on each path may be the 'destination' of the path. In an exemplary implementation, the system maintains a list of question and answer pairs as paths (in Menu Table 900 (FIG. 9) described below). The destination resources are the answers to questions. When a user asks a question it is added to the list and when the question is answered, the answer is paired with the corresponding question on the list (by adding them to the same row in Menu Table 900). In other implementations, the destination resources may be the resources above an interest threshold or if the resources are organized in a hierarchy the destination resources may be the leaves of the hierarchy (the final destination when traveling from the top of the hierarchy).

It then stands to reason that the total time the user spends on the path (or paths) to each of the interesting resources can be calculated. Namely, in step 504, a total time for each path is calculated based on the time spent on each of the resources in the given path.

Figure 6:
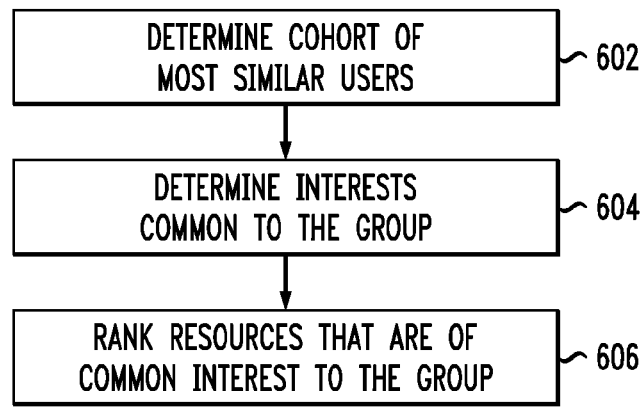
FIG. 6 is a diagram illustrating exemplary methodology for finding cohorts of users with similar interests and ordering resources for the group based on popularity according to an embodiment of the present invention.

As described above, when there are a plurality of recordings and a plurality of users, the system chooses the resources that are most interesting amongst a subset of similar users (cohort). The process by which the system can perform such a task is now described. FIG. 6, for example, is a diagram illustrating exemplary methodology 600 for finding cohorts of users with similar interests and ordering resources for the group based on popularity.

In step 602, a cohort (subset) of most similar users is determined. In an exemplary implementation, users who have a common interest in at least one of the destination resources (e.g., answers) are first grouped together. The system then sorts these users (the 'proximal users') by their similarity with the current user. Here, similarity is determined by user interest in the same recordings as calculated in methodology 300 (FIG. 3) or methodology 400 (FIG. 4). The system first finds the destination resources that both users have accessed more than some minimum threshold. For each of these common destination resources, the system finds the lesser of the amount of time the first user has spent along the path to the destination resource and the second user has spent along the path to the destination resource (the common path time). In some embodiments, some sets of resources may be deemed more important than others (e.g., answers may be more important than questions) for the purposes of computing interest. The system then computes a normalized common path time by dividing the common path time by the length of the recordings along the path (the length of the question and the length of the answer). Note that if the user has listened to the voice recordings along the path multiple times, the normalized time may be greater than 1.0 for one or more of the resources on the path. It may be preferable in some situations to treat repeated accesses and a single access. In the preferred implementation, the system computes the path score as one plus the logarithm of the normalized common path time. This is done to reduce the contribution from repeated accesses to resources on the path. The other users' level of similarity with the user is then the sum of the path scores of the common destination resources (the user similarity score). The system finds the user with the greatest user similarity score, then computes the level of user similarity as the smaller user similarity score as a percentage of the greater user similarity score. If the user similarity score is above a threshold then the user is retained as a cohort user. The preferred implementation uses 0.5 as the threshold. If this constant is too low, there may be a large group of similar users and the methodology will run more slowly, whereas if the constant is too high, there may be too small a group of similar users or even none. If there are no similar users, there will be no recommended resources. This grouping of users (also called the cohort or 'nearest neighbor' users) represents a subset of the total number of users of the system.

In step 604, interests common to the cohort are determined. These common interests of the cohort are, for example, destination resources that multiple users in the cohort found interesting (as determined in step 304 or 404, of methodology 300 (FIG. 3) or methodology 400 (FIG. 4), respectively).

Using an exemplary method, the cohort's normalized common path time to each destination resource is used. Using another exemplary method, the minimum number of accesses by the cohort to each destination resources is used. The method is the same as that used in step 602 except that instead of determining the interests common to the proximal users, the interests common to the cohort users are being determined.

In step 606, the (destination) resources that were found to be of common interest to multiple users in the cohort (in step 604) are ranked based on popularity (or level of common interest). In an exemplary implementation, the popularity, also called the score, is determined by sorting by normalized common path time. In another exemplary implementation, the popularity is determined by number of accesses. Say for example, that 10 users in the cohort found voice recording A interesting and 20 users in the cohort found voice recording B interesting. Then voice recording B would be considered more popular than voice recording A, and thus would be ranked higher than voice recording A. This popularity factor can be based, e.g., on the total number of times resources on the path were accessed by all of the users in the cohort and/or by the (normalized) time spent on resources on the path that have been played by all the users in the cohort as detailed in step 602. The destination resources (and in some embodiments the paths to each destination resource), sorted by popularity (score), are the recommendations. The details of computing a normalized time for a path were described in conjunction with the description of FIG. 5, above.

These recommendations are stored with each User ID in the cohort. A row is added to Recommendation Table 800 (FIG. 8), described below, for each User ID in the cohort with the sorted list of recommendations and the score. Whenever a user in the cohort accesses the system again (as in step 104 of methodology 100 (FIG. 1), the user is presented with resources in an order based on the ranking of step 606, as previously detailed in conjunction with the description of FIG. 2, above. For example, the paths ranked higher (based on popularity with the cohort) are presented before those paths that have a lower ranking. Using the example immediately above, resource B would be presented before resource A. A specific example of an implementation of methodology 600 is presented below.

FIG. 7 is a diagram illustrating an exemplary device table 700. As described above, a device table can be used by the system to store the caller ID or other unique identifier for the device used by the user (i.e., the User ID). These unique identifiers for the device used by the user are termed "phonenumber."

FIG. 8 is a diagram illustrating an exemplary recommendation table 800. As highlighted above, a recommendation table contains an ordered list of recommended resources that can be retrieved given the User ID. As shown in FIG. 8, Recommendation Table 800 contains columns for "phonenumber," the unique identifier for the device used by the user, "uris," an ordered list of paths and "score," used to order the recommended uri(s). For efficiency, only the uri of destination resource is stored in the uris, since the entire path can be reconstructed from the menu table (see below).

FIG. 9 is a diagram illustrating an exemplary menu table 900. As highlighted above, a menu table is a table that provides a correspondence between question and answer that can be used to create voice menus. As shown in FIG. 9, Menu Table 900 contains columns for "quesuri," the uri of a question (more generally this could be the 'parenturi' of the path), "ansuri," the uri to the answer (more generally this could be the 'destinationuri' of the path), "pathduration," total of duration accessing question and answer (note that the duration may not be added unless they traverse the whole path) and "numaccpath," total number of accesses to the question and answer on this path (if there are internal resources they would all be counted).

FIG. 10 is a diagram illustrating an exemplary interest table 1000. As highlighted above, an interest table is a table of measures of user interest in resources. As shown in FIG. 10, Interest Table 1000 contains columns for "phonenumber," see above, "uri," see above, "numacc," the number of times the uri has been played by this phoneumber and "duration," the amount of time this uri has been played by this phonenumber.

FIG. 11 is a diagram illustrating an exemplary resource table 1100. A resource table is a table of resources. As shown in FIG. 11, Resource Table 1100 contains columns for "uri," see above, "totalduration," the length of time the resource runs when not interrupted, "incrduration," the maximum amount of time the resource has been played by any one user in one access and "resourcetype," "question" or "answer." If totalduration is not known, then the system records the duration played by a user if it is longer the totalduration stored, in order to provide an estimate of the length of the recording.

Figure 12:
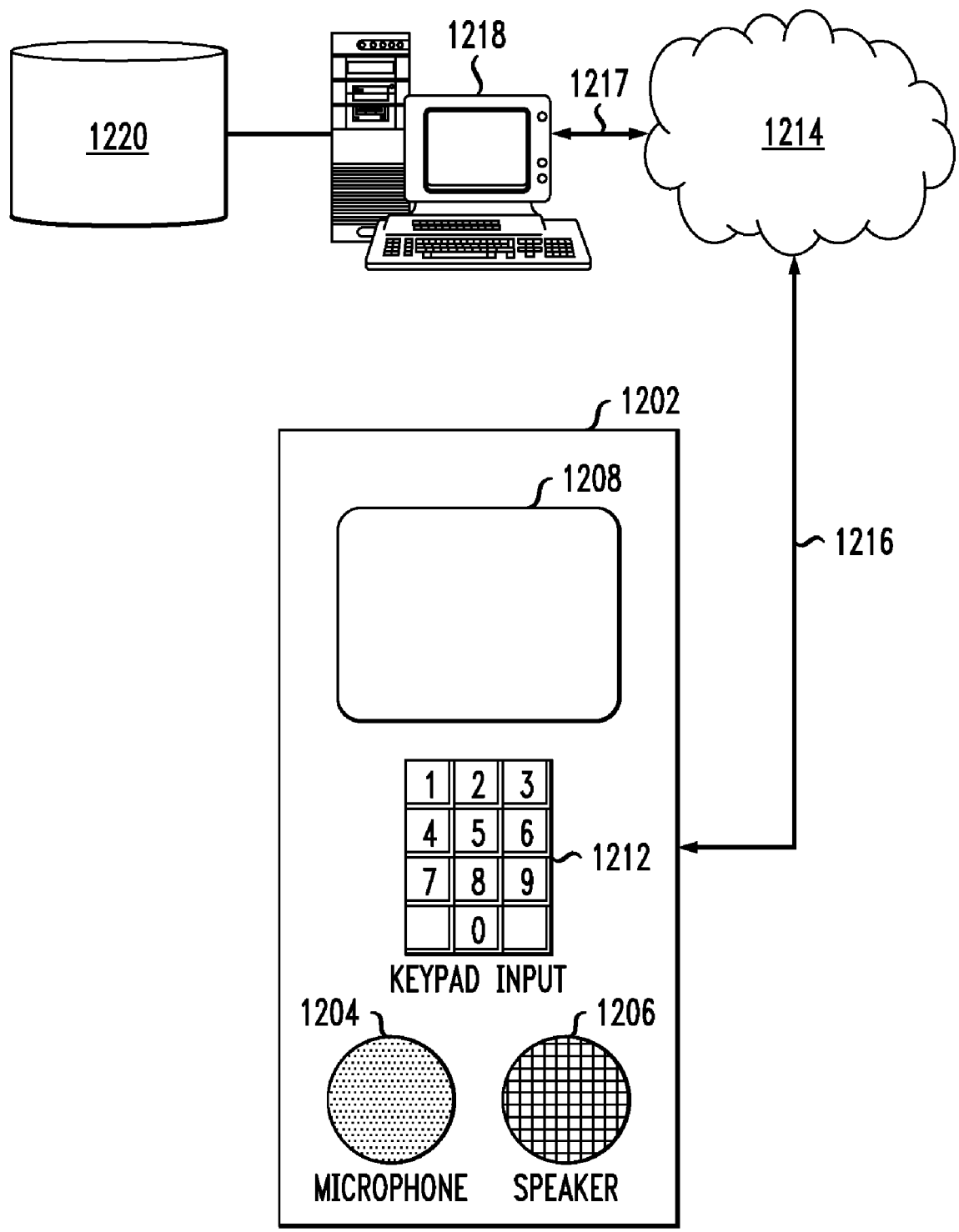
FIG. 12 is a diagram illustrating an exemplary communications system according to an embodiment of the present invention.

FIG. 12 is a diagram illustrating an exemplary communications system 1200 (for example an IVR system) that, as described in detail below, can include a user-interactive system that has a plurality of resources through which a user can navigate. System 1200 includes one or more client computing devices 1202. Client computing device 1202 may be any type of computing device. In one embodiment, client computing device 1202 includes a microphone 1204 and a speaker 1206. Client computing device 1202 may be a cellular or "smart" phone, a PDA or other hand held communications (computing) device or a landline telephone that includes a microphone 1204 and a speaker 1206. For completeness, other components of client computing device 1202 may include a display screen 1208 and an input key pad 1212. It shall be understood that some of the components of client computing device 1202 may be combined together. Client computing device 1202 may include the ability to connect to a telecommunications voice network, capture audio and/or broadcast audio.

Client computing devices 1202 may be coupled to a communications network 1214 (operated by the, e.g., phone's carrier). Communications network 1214 may be a cellular network in one embodiment. For example, communications network 1214 could be a GSM, TDMA, 2G, 3G or 4G wireless network. Communications network 1214 could also be a wireline telecommunications network offering telephone service (Plain Old Telephone Service or POTS). Communications link 1216 represents hardware connecting client computing device 1202 (i.e., the phone) to the telecommunication carrier's network. Of course, communications link 1216 could be wireless or physical. In one exemplary embodiment, communications network 1214 includes a connection to an intranet or the Internet. The voice on the telecommunications voice network could be carried over the Internet Protocol (IP) as is commonly done in VoIP (Voice-over-Internet-Protocol).

The system 1200 may also include a user-interactive system 1218 that has a plurality of resources through which a user can navigate. User-interactive system 1218 may be configured to perform, e.g., the steps of methodology 100 (FIG. 1). An exemplary apparatus that may serve as user-interactive system 1218 is presented in FIG. 13, described below. User-interactive system 1218 is coupled to communications network 1214. Accordingly, user-interactive system 1218 may communicate with client computing device(s) 1202 over communications network 1214. In one exemplary embodiment, user-interactive system 1218 may be implanted on a computer server. In some embodiments, communications network 1214 is a telecommunications network, for example, the public switched telephone network, or in other embodiments it may be a private telephone network. Accordingly, the connection 1217 between user-interactive system 1218 and communications network 1214 may be a computer telephony interface (CTI) card plugged into user-interactive system 1218. User-interactive system 1218, in some embodiments, may be configured to run an Interactive Voice Response system (IVR), a voice communications system that provides a public telephone switch or a private branch eXchange (PBX). In some embodiments, user-interactive system 1218 may include a software program that responds to signals generated by the IVR. For example, the signals could include 'incoming call,' 'hangup,' touchtone key press, and any number of other signals. In some embodiments, the software program can record audio originating at the microphone 1204 and store this at a location for example, in a file on a computer server and in some embodiments, it can retrieve audio from a location, for example, from a file on a computer server, and play the audio so that it can be heard on the telephone speaker 1206. In some embodiments, user-interactive system 1218 may include a web application that runs on a web application server. The web application handles requests and generates responses. The requests may be HTTP requests. The responses may be HTTP responses. The HTTP responses may include an XML document. In some embodiments, the XML document is VoiceXML. In some embodiments, the user-interactive system 1218 may include a VoiceXML browser that interprets VoiceXML and controls the IVR.

User-interactive system 1218 runs an IVR like Asterisk™ or Websphere Voice Server™ that runs a VoiceXML Browser. The VoiceXML Browser generates requests to the Web application server, that run the Java Web application, that carries out the logic detailed in the present techniques. The Java Web application generates Voice XML that is returned and executed on the VoiceXML Browser as part of the IVR.

The system 1200 may also include a database 1220 coupled to user-interactive system 1218. Database 1220 may store information utilized by user-interactive system 1218. In one embodiment, user-interactive system 1218 may include the database 1220 within it. In one exemplary embodiment, database 1220 is a MySQL® open source database and contains tables of relational data (for example, the recommendations table). These tables are accessed by the Java Web application that carries out the logic detailed in the present techniques (collaborative filtering, generating voice menus, etc.).

Figure 13:
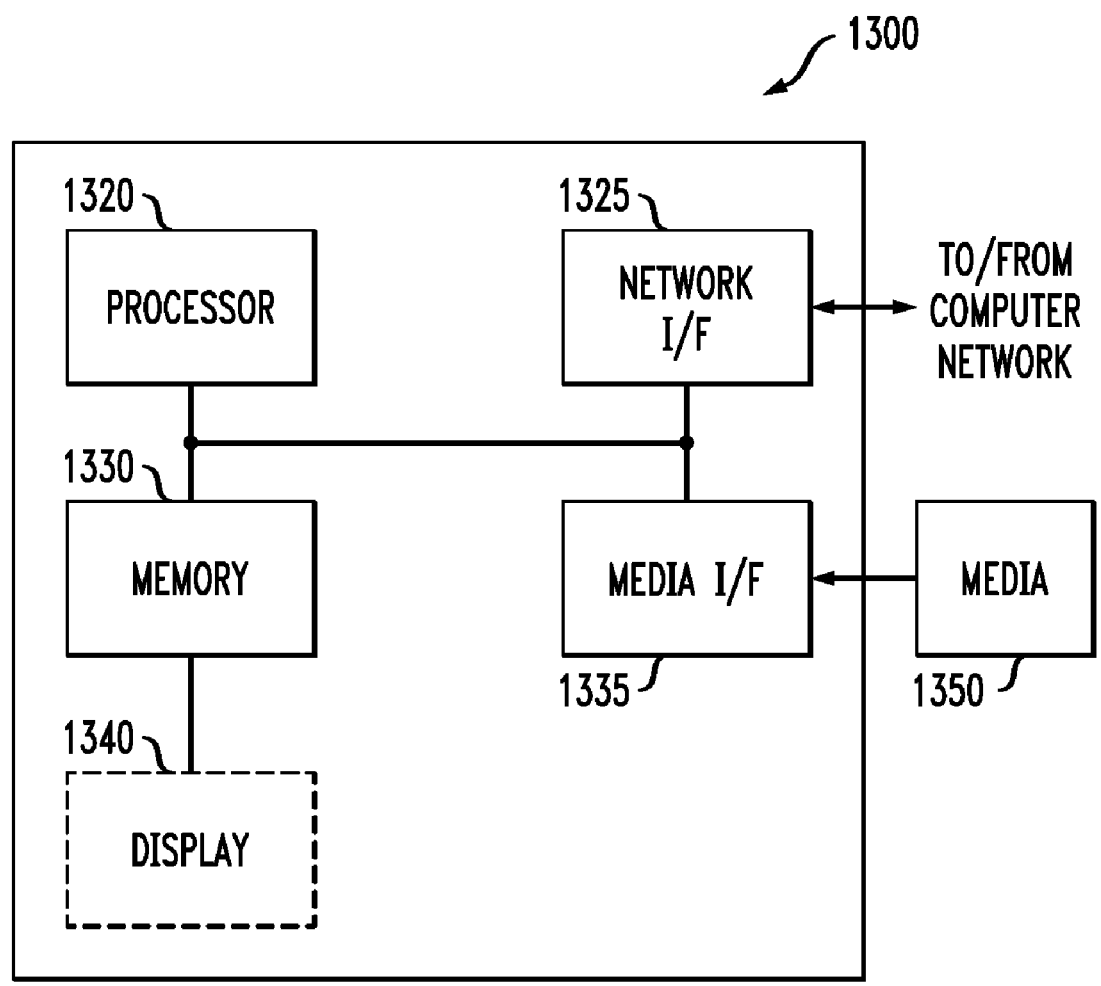
FIG. 13 is a diagram illustrating an exemplary apparatus for implementing one or more of the methodologies presented herein according to an embodiment of the present invention.

Turning now to FIG. 13, a block diagram is shown of an apparatus 1300 for implementing one or more of the methodologies presented herein. As described above, apparatus 1300 may serve as the user-interactive system component of communications system 1200, and thus can be configured to implement, for example, one or more of the steps of methodology 100 of FIG. 1.

Apparatus 1300 comprises a computer system 1310 and removable media 1350. Computer system 1310 comprises a processor device 1320, a network interface 1325, a memory 1330, a media interface 1335 and an optional display 1340. Network interface 1325 allows computer system 1310 to connect to a network, while media interface 1335 allows computer system 1310 to interact with media, such as a hard drive or removable media 1350.

As is known in the art, the methods and apparatus discussed herein may be distributed as an article of manufacture that itself comprises a machine-readable medium containing one or more programs which when executed implement embodiments of the present invention. For instance, when apparatus 1300 is configured to implement one or more of the steps of methodology 100 the machine-readable medium may contain a program configured to when the user accesses the system, present the resources to the user in a particular order; determine interests of the user in the resources presented; compare the interests of the user to interests of other users to find one or more subsets of users to which the user belongs by virtue of having similar interests; and upon one or more subsequent accesses to the system by the user, basing the order in which the resources are presented to the user on interests common to the one or more subsets of users to which the user belongs.

The machine-readable medium may be a recordable medium (e.g., floppy disks, hard drive, optical disks such as removable media 1350, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1320 can be configured to implement the methods, steps, and functions disclosed herein. The memory 1330 could be distributed or local and the processor device 1320 could be distributed or singular. The memory 1330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1320. With this definition, information on a network, accessible through network interface 1325, is still within memory 1330 because the processor device 1320 can retrieve the information from the network. It should be noted that each distributed processor that makes up processor device 1320 generally contains its own addressable memory space. It should also be noted that some or all of computer system 1310 can be incorporated into an application-specific or general-use integrated circuit.

Optional video display 1340 is any type of video display suitable for interacting with a human user of apparatus 1300. Generally, video display 1340 is a computer monitor or other similar video display.

The present techniques are further described by way of reference to the following non-limiting examples. A prototype collaborative filtering-based navigation system based on the present techniques was implemented. Historical data was used from a pilot study that was run in the state of Gujarat in India. In this deployment, an IVR-based knowledge sharing platform for farmers was used, where farming-related questions could be posted and answered by other farmers, or by specific experts. The system was used continuously for over a year by over 500 registered farmers who were spread over 28 villages in Gujarat. When a user called into the system, the voice recordings of questions and their related answers were provided to the user in chronological order (most recent first). That is, if an answer was provided to a new question (a question recently asked by a user) or a new question was posted, the new question and any answers were listed first. The sequence of browsing actions by the user was logged along with corresponding time stamps. The log indicated whether a user had recorded a question or an answer and whether a user has listened to a question, an answer posted by an expert, or an answer from another user. Each log contained specific header information including the details about the caller identification (ID), time and date, and the specific audio file that was accessed. The following is a typical log line header:
[2009-06-29 at 08:50:54 AM IST on DSC from 1141292198] Caller is listening to user Answer URI A1426395787.vox posted on 2009-01-15 10:38:49.22.

Figure 14B:
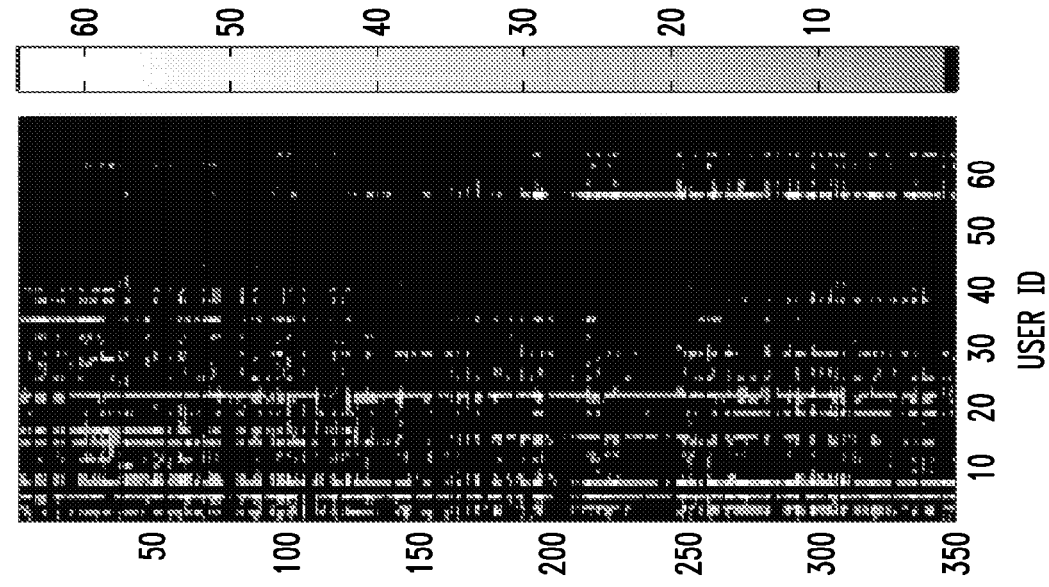
FIGS. 14A and 14B are diagrams illustrating User ID×Resource ID matrices using number of accesses according to an embodiment of the present invention.
Figure 14A:
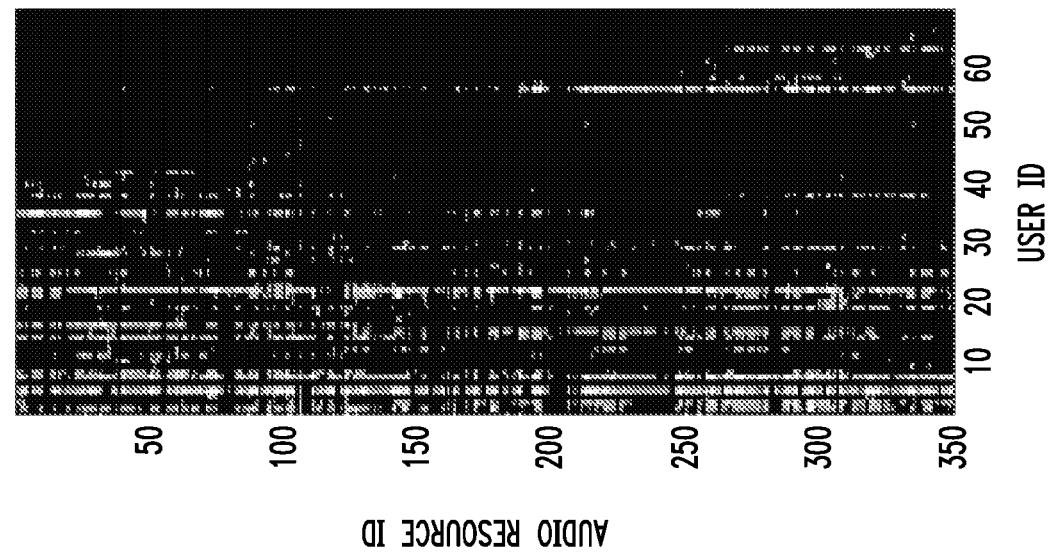

The present techniques were implemented in an IVR system supporting questions and answers. The usage logs of n users accessing a total of m voice recordings can be parsed to create two n×m matrices $X=x_{i,j}$, where $x_{i,j}$ is the number of times user i has accessed (listened to) voice recording j, and $Y=y_{i,j}$, where $y_{i,j}$ is a measure of the total amount of time user i has accessed (listened to) voice recording j. In the following, the focus is on a subset of the available data with n=69 users and m=351 voice recordings. The matrix X has over 50,000 accesses to individual voice recordings. Two approaches to collaborative filtering are neighborhood methods and latent factor models. In the neighborhood model, a distance measure is defined between any two rows (users) in matrix X using the Euclidean norm. For any given user a set of like-minded users is then identified who have accessed a similar set of voice recordings and then the most popular set of voice recordings among this set are recommended (this is the technique described herein in detail). In the latent factor models, matrix factorization methods such as Singular Value Decomposition (SVD) and Nonnegative matrix factorization (NMF) have been employed. The SVD analysis shows that the singular values of X decay rapidly, and there exist good low-rank approximations of X (see, for example, FIGS. 14A and 14B). FIGS. 14A and 14B are diagrams illustrating User ID×Resource ID matrices 1400A and 1400B, respectively, using number of accesses (i.e., rather than duration). Matrix 1400A displays number of accesses and matrix 1400B displays predicted number of accesses. A key is provided to the right of matrix 1400B (wherein the darker the shading the more number of accesses). FIGS. 14A and 14B illustrate that the SVD model with a small number of dimensions is able to reconstruct the matrix (matrix 1400B) such that the two matrices look (nearly) identical.

Indeed, the NMF approach supports this notion in being able to approximate X with a small number of latent factors. In both SVD and NMF, soft-clustering was applied on the basis vectors (latent factors) to cluster the rows in X and use the cluster center to suggest an ordering of the voice recordings for navigation for a given user. The initial results underscore the promise of employing collaborative filtering as a way of recommending multiple relevant resources that are then dynamically structured for easy navigation.

FIGS. 15A-D are tree diagrams 1500A-D, respectively, illustrating an exemplary implementation of the present techniques. By way of reference to FIG. 15A, farmer A accesses the system. The path farmer A takes through the resources in the system is indicated with dotted arrows. For example, when farmer A calls into the system he is given a choice to access voice recordings related to problems associated with growing rice and problems associated with growing beans. Farmer A chooses to hear voice recordings about growing rice. Farmer A then hears a voice recording explaining how water helps rice grow. The numerals (1), (2), etc. in FIGS. 15A-D indicate the level in the tree. The dotted lines in each figure represent the path the user took through the resources (e.g., questions, such as why rice doesn't grow, and answers, such as how water helps rice), and hence the order in which the resources were presented.

Figure 15A:
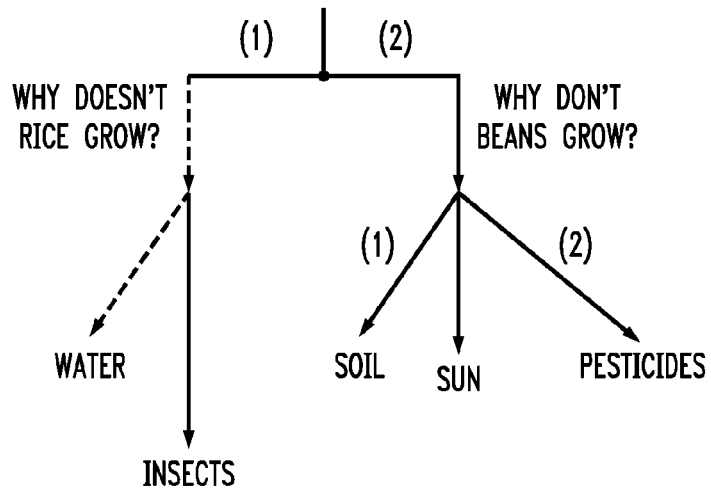
FIGS. 15A-D are tree diagrams illustrating an exemplary implementation of the present techniques according to an embodiment of the present invention.
Figure 15B:
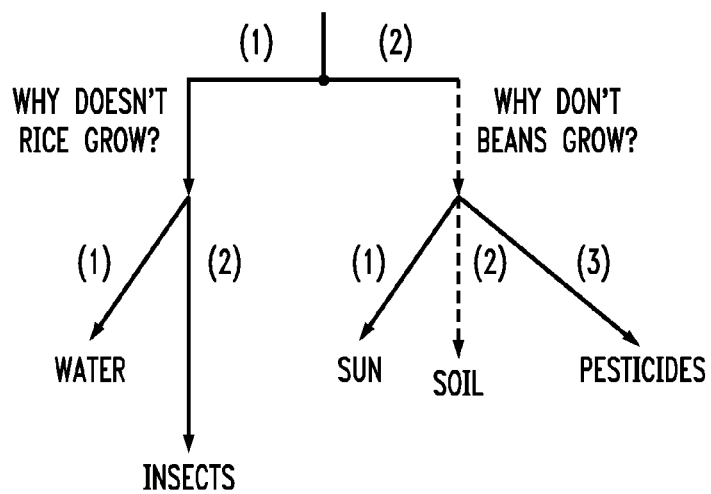

By way of reference to FIG. 15B, farmer B accesses the system. The path farmer B takes through the resources in the system is indicated with dotted arrows. For example, upon connecting with the system, farmer B is given the same options as farmer A, see description of FIG. 15A above. This happens because farmer B had not previously accessed the system so there is no historical interest data to use for recommendations. In contrast to farmer A, farmer B chooses to hear voice recordings about growing beans. Farmer B then hears a voice recording explaining how soil helps beans.

Figure 15C:
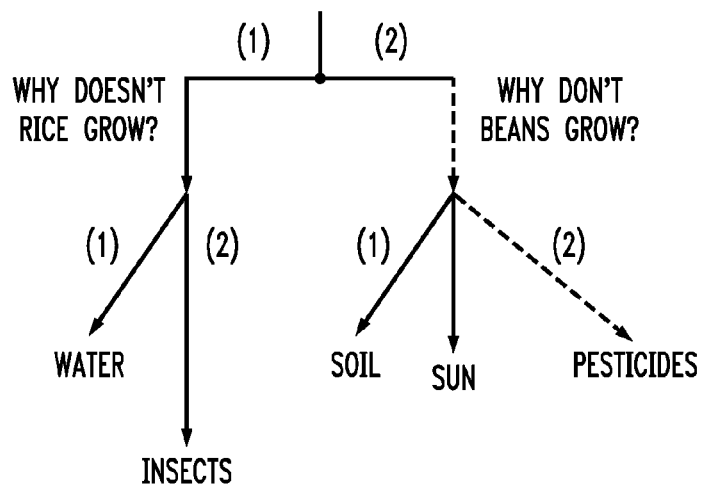
Figure 15D:
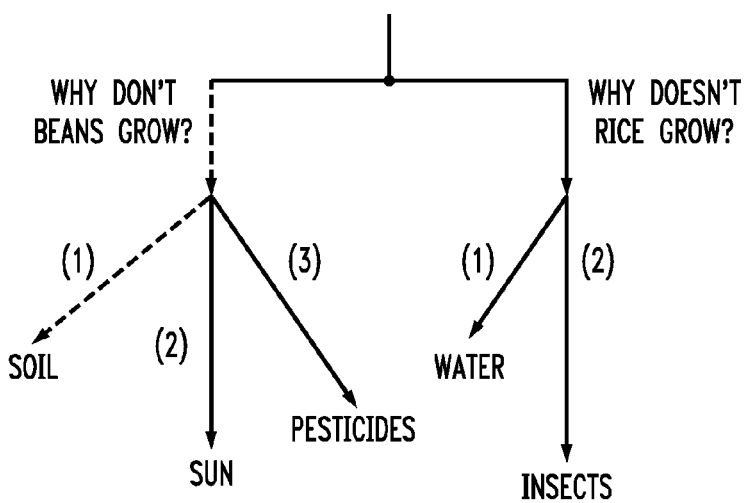

By way of reference to FIG. 15C, farmer C accesses the system. The path farmer C takes through the resources in the system is indicated with dotted arrows. For example, upon connecting with the system, farmer C is given the same options as farmer A and farmer B. Like farmer B, farmer C chooses to hear voice recordings about growing beans. However, farmer C hears a voice recording explaining how pesticides hurt beans.

As highlighted above, the system keeps track of the identity (ID) of the users who access the system as well as a log of the resources the user has accessed. Thus, by way of reference to FIG. 15D, when farmer C accesses the system a second time, since farmer C has already listened to the voice recording relating to pesticides, farmer C is first presented with the option of hearing a voice recording relating to soil (the option to listen to the voice recording relating to pesticides has been moved to the end of the list because it was already accessed).

Although illustrative embodiments of the present invention have been described herein, it is to be understood that the invention is not limited to those precise embodiments, and that various other changes and modifications may be made by one skilled in the art without departing from the scope of the invention. The contents of each of the references mentioned above are hereby incorporated by reference herein.

What is claimed is:

1. A method for operating a system having a plurality of resources through which a user can navigate, the method comprising the steps of:
    when the user accesses the system, presenting the resources to the user in a particular order;
    determining interests of the user in the resources presented;
    wherein the interests of the user are determined from a level of activity of the user along paths to the resources;
    comparing the interests of the user to interests of other users to find one or more subsets of users to which the user belongs by virtue of having similar interests; and
    upon one or more subsequent accesses to the system by the user, basing the order in which the resources are presented to the user on interests common to the one or more subsets of users to which the user belongs,
    wherein the basing step further comprises the step of: reordering the resources based on the paths taken by the subsets of users having similar interests.

2. The method of claim 1, further comprising the step of:
    upon one or more subsequent accesses to the system by the user, changing the order in which the resources are presented to the user based on interests common to the one or more subsets of users to which the user belongs.

3. The method of claim 1, wherein the determining step further comprises the steps of: calculating an amount of time the user spent on each of the resources; and determining whether user spent a minimum amount of time on each of the resources.

4. The method of claim 1, wherein the determining step further comprises the steps of: calculating a number of times the user accessed each of the resources; and determining whether each of the resources was accessed at least a minimum number of times.

5. The method of claim 1, further comprising the step of: when the user accesses the system for the first time, presenting the resources to the user in a default order.

6. The method of claim 1, further comprising the step of: recording a user ID for each of the users that accesses the system.

7. The method of claim 1, wherein the system comprises an interactive voice response (IVR) system.

8. The method of claim 7, wherein the users can access the system via telephone.

9. The method of claim 1, wherein the resources comprise one or more of audio, video, documents and animations.

10. The method of claim 9, wherein the resources comprise voice recordings.

11. The method of claim 10, wherein the voice recordings comprise questions and answers.

12. The method of claim 11, further comprising the step of: providing the user with an option to record a question.

13. The method of claim 11, further comprising the step of: providing the user with an option to record an answer to a question.

14. The method of claim 1, further comprising the step of: grouping the user with other users that have a common interest in at least one of the resources presented to form the one or more subsets of users having similar interests.

15. The method of claim 14, further comprising the step of: ranking resources that are of common interest to the one or more subsets of users based on popularity amongst the users in each of the one or more subsets of users.

16. The method of claim 15, further comprising the step of: upon one or more subsequent accesses to the system by the user, changing the order in which the resources are presented to the user based on the ranking of the resources.

17. The method of claim 1, further comprising the step of: determining a level of activity of the user along paths to the resources.

18. An apparatus for operating a system having a plurality of resources through which a user can navigate, the apparatus comprising:
a memory; and
at least one processor device, coupled to the memory, operative to: when the user accesses the system, present the resources to the user in a particular order;
determine interests of the user in the resources presented;
wherein the interests of the user are determined from a level of activity of the user along paths to the resources;
compare the interests of the user to interests of other users to find one or more subsets of users to which the user belongs by virtue of having similar interests; and
upon one or more subsequent accesses to the system by the user, base the order in which the resources are presented to the user on interests common to the one or more subsets of users to which the user belongs,
wherein the basing step further comprises the step of: reordering the resources based on the paths taken by the subsets of users having similar interests.

19. An article of manufacture for operating a system having a plurality of resources through which a user can navigate, comprising a machine-readable medium containing one or more programs which when executed implement the steps of the method according to claim 1.

* * * * *